US008820556B2

(12) United States Patent  (10) Patent No.: US 8,820,556 B2
Khan  (45) Date of Patent: Sep. 2, 2014

(54) MOLDED BOTTLE FOR LIQUIDS

(71) Applicant: Farhan Khan, Sanford, FL (US)

(72) Inventor: Farhan Khan, Sanford, FL (US)

(*) Notice: Subject to any disclaimer, the term of this patent is extended or adjusted under 35 U.S.C. 154(b) by 0 days.

(21) Appl. No.: 13/661,149

(22) Filed: Oct. 26, 2012

(65) Prior Publication Data

US 2014/0116978 A1 May 1, 2014

(51) Int. Cl.
B65D 90/02 (2006.01)

(52) U.S. Cl.
USPC ........... 215/381; 215/382; 215/274; 215/273; 215/44; 215/43; 220/483; 220/608; 220/635; 220/636; 220/709; 248/309.1; 248/309.3; 248/362

(58) Field of Classification Search
USPC ....................... 220/212.5, 604–606, 608–609, 220/707–709, 714, 476, 483, 635–636; 215/43–44, 273–274, 316, 371–373, 215/376–377, 381–382, 384; 248/362, 248/309.1, 309.3, 363, 346.01, 683
See application file for complete search history.

(56) References Cited

U.S. PATENT DOCUMENTS

| 1,587,874 | A | * | 6/1926 | Strickland | 248/362 |
| 2,905,351 | A | * | 9/1959 | Lerner | 215/376 |
| 2,908,473 | A | * | 10/1959 | Snyder | 248/683 |
| 3,159,317 | A | * | 12/1964 | Mini | 222/341 |
| 3,383,001 | A | * | 5/1968 | Wei | 220/4.26 |
| 3,843,005 | A | * | 10/1974 | Uhlig | 215/373 |
| 4,726,553 | A | * | 2/1988 | Wischusen, III | 248/146 |
| 4,756,497 | A | * | 7/1988 | Lan | 248/205.9 |
| 4,955,493 | A | * | 9/1990 | Touzani | 215/372 |
| 5,180,132 | A | * | 1/1993 | Pearson et al. | 248/362 |
| 5,301,845 | A | * | 4/1994 | Labonte | 222/211 |
| 5,337,918 | A | * | 8/1994 | Wang | 220/708 |
| D357,170 | S | * | 4/1995 | Wellsfry | D8/349 |
| 5,406,808 | A | * | 4/1995 | Babb et al. | 62/457.4 |
| 5,799,501 | A | * | 9/1998 | Leonard et al. | 62/457.3 |
| 5,906,286 | A | * | 5/1999 | Matsuno et al. | 215/375 |
| 5,961,086 | A | * | 10/1999 | Moore et al. | 248/314 |
| 6,745,987 | B2 | * | 6/2004 | Rousselet et al. | 248/363 |
| 7,726,621 | B1 | * | 6/2010 | Dellinger | 220/737 |
| 2005/0077305 | A1 | * | 4/2005 | Guevara | 220/737 |
| 2007/0045217 | A1 | * | 3/2007 | Cho | 215/236 |
| 2007/0084821 | A1 | * | 4/2007 | Bysick et al. | 215/373 |
| 2007/0113580 | A1 | * | 5/2007 | Robertson et al. | 62/464 |
| 2007/0181403 | A1 | * | 8/2007 | Sheets et al. | 198/617 |
| 2008/0223739 | A1 | * | 9/2008 | Thompson | 220/709 |
| 2008/0237233 | A1 | * | 10/2008 | Choi et al. | 220/212.5 |
| 2009/0026103 | A1 | * | 1/2009 | Sieber | 206/459.1 |

(Continued)

FOREIGN PATENT DOCUMENTS

EP 1884474 A2 * 6/2008
KR 20-0332505 Y1 * 11/2003

Primary Examiner — Mickey Yu
Assistant Examiner — Brijesh V. Patel
(74) Attorney, Agent, or Firm — McKinney Law, PLLC

(57) ABSTRACT

A molded bottle for liquids is disclosed. In a particular embodiment, the bottle includes a hollow body portion adapted to store liquids therein, with an opening on a top of the body portion to access an interior of the bottle. In addition, the bottle includes a sidewall that extends outward around a bottom periphery of the body portion, where the bottle is supported by an edge of the sidewall when the bottle is placed on a planar surface. The sidewall is configured to flex when the bottle is pressed down onto the planar surface to form a vacuum between the body portion and the planar surface to prevent the bottle from moving.

2 Claims, 3 Drawing Sheets

(56) References Cited

U.S. PATENT DOCUMENTS

| | | | |
|---|---|---|---|
| 2009/0045224 A1* | 2/2009 | Faaborg et al. | 222/111 |
| 2009/0078712 A1* | 3/2009 | Zimmerman | 220/636 |
| 2009/0159556 A1* | 6/2009 | Patcheak et al. | 215/373 |
| 2009/0302038 A1* | 12/2009 | Taggart et al. | 220/260 |
| 2010/0065527 A1* | 3/2010 | Zuberi | 215/329 |
| 2010/0127005 A1* | 5/2010 | Sanbrook et al. | 220/705 |
| 2011/0017756 A1* | 1/2011 | Finell | 220/732 |
| 2011/0062170 A1* | 3/2011 | Kemper et al. | 220/708 |
| 2012/0205340 A1* | 8/2012 | Massad | 215/376 |
| 2012/0234862 A1* | 9/2012 | Kharbanda | 222/173 |

* cited by examiner

MOLDED BOTTLE FOR LIQUIDS

I. FIELD

The present disclosure is generally related to a molded bottle for liquids.

II. DESCRIPTION OF RELATED ART

Cup holders are used to hold cans and bottles that contain liquids. For example, many vehicles and boats have built-in cup holders at various locations. However, the space limitations prevent placing a cup holder in every possible location in a vehicle or boat. Accordingly, portable cup holders have been developed that allow a can or bottle to placed inside and moved to any desired location.

For example, one type of cup holder is generally known as a koozie and it has been used to hold and maintain a cool temperature of a single bottle or beverage can. The koozie typically uses a flexible insulating layer that is formed into a shape of can, so that the can (or bottle) may be slid into the koozie. In use, a person's hand holding the koozie is insulated from transferring the heat of the person's hand to the beverage can or bottle. The bottom of the koozie may have a non-skid surface to prevent it from sliding. A disadvantage of the portable cup holders and koozies is that they are easily misplaced and may not be found when needed to hold a can or bottle.

Another shortcoming is that the portable cup holders and koozies are susceptible to being knocked over by accident or tipped over when in a moving vehicle or boat. Accordingly, there is a need for a bottle that is able to stay firmly secured to a surface and will not slide or tip over without the use of a cup holder or koozie.

III. SUMMARY

In a particular embodiment, a molded bottle for liquids is disclosed. The bottle includes a hollow body portion adapted to store liquids therein, with an opening on a top of the body portion to access an interior of the bottle. In addition, the bottle includes a sidewall that extends outward around a bottom periphery of the body portion, where the bottle is supported by an edge of the sidewall when the bottle is placed on a planar surface. The sidewall is configured to flex when the bottle is pressed down onto the planar surface to form a vacuum between the body portion and the planar surface to prevent the bottle from moving.

In another particular embodiment, the bottle includes a body portion adapted to store liquids therein, and an annular flange molded as part of the bottle, wherein the annular flange extends outward from a lower portion of the bottle to support the body portion.

In yet another particular embodiment, the bottle includes a hollow body portion adapted to store liquids therein, and a bottom of the bottle is configured to flex outward when the bottle is pressed down onto the planar surface to form a vacuum between the body portion and the planar surface to prevent the bottle from moving.

One particular advantage provided by embodiments of the molded bottle for liquids is that the bottle includes a means to secure the bottle directly to a planar surface. Accordingly, a separate cup holder is not required so that the molded bottle is able to be placed anywhere providing improved convenience and ease of use.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figures 1, 2:
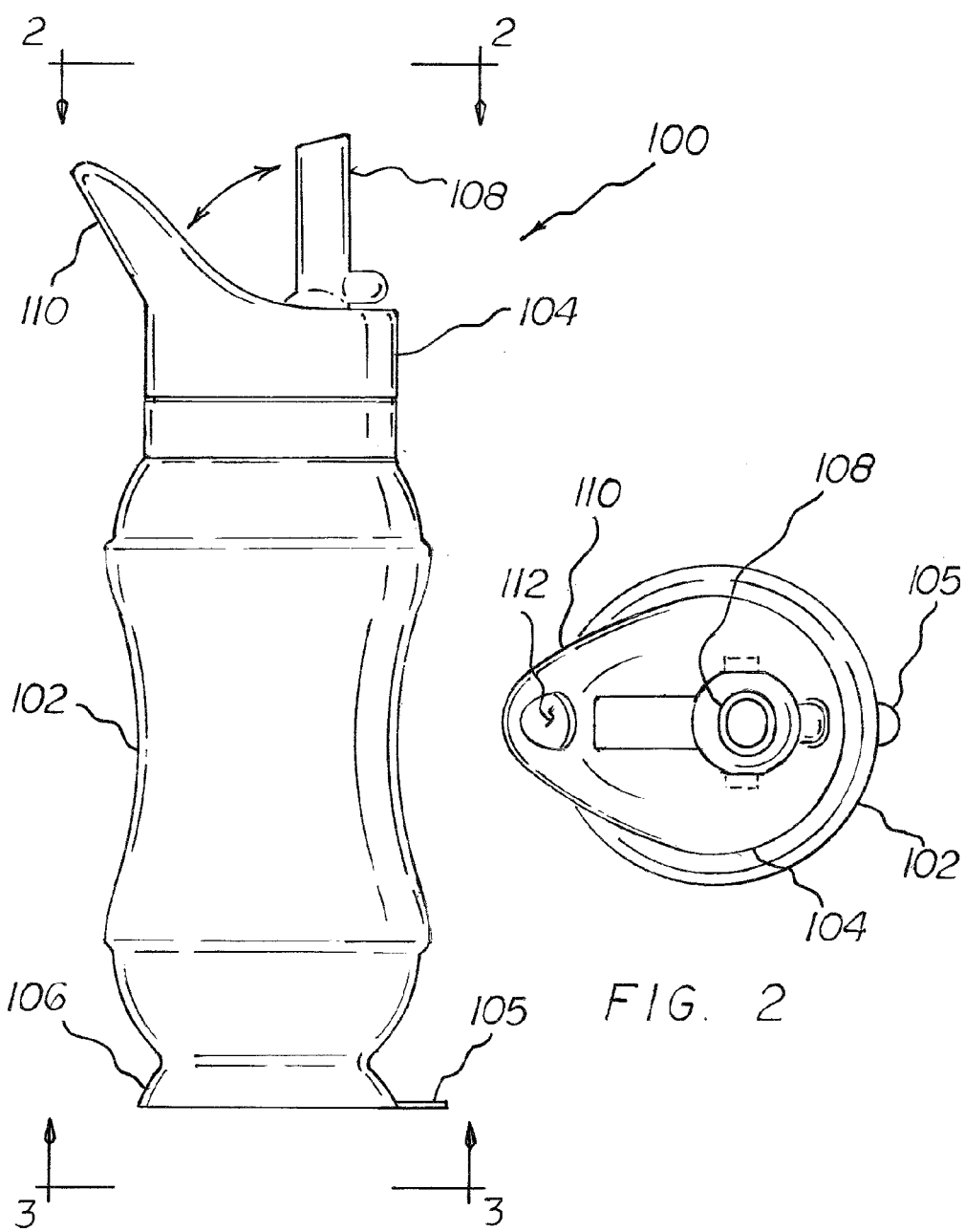
FIG. 1 is an elevational view of a particular illustrative embodiment of a molded bottle for liquids.
FIG. 2 is top view of the particular illustrative embodiment of the molded bottle for liquids.

Referring to FIG. 1, a particular illustrative embodiment of a molded bottle for liquids is disclosed and generally designated 100. The bottle 100 includes a body portion 102, which is hollow and adapted to store liquids therein. In a particular embodiment, an annular sidewall 106 extends outward around a bottom periphery of the body portion 102 forming a concave surface, where the bottle 100 is supported by an edge of the annular sidewall 106 when the bottle 100 is placed on a planar surface. The annular sidewall 106 is configured to flex when the bottle 100 is pressed down onto the planar surface to form a vacuum between the body portion 102 and the planar surface to prevent the bottle 100 from moving. A tab 105 is secured to the edge of the annular sidewall 106 and adapted to release the vacuum between the annular sidewall 106 and the planar surface. Accordingly, the annular sidewall 106 permits the quick and easy connection and disconnection of the bottle 100 to a surface. Preferably the body portion 102 of the bottle 100 is made of silicone or other suitable material.

In use, according to one embodiment, the bottle 100 can be attached to a surface by pressing the annular sidewall 106 down against the planar surface. One advantage of this embodiment is that a user can hold the bottle 100 in one hand and secure it to any location on the planar surface. This aspect of this embodiment is particularly useful where the bottle 100 is used on a boat where smooth planar surfaces are prevalent near seating surfaces. The bottle 100 may be removed from the planar surface by simply pulling the bottle 100 with sufficient force to break the vacuum seal of the annular sidewall 106 or by pulling upwards on the tab 105.

The cap 104 may also include a retractable spout 108 adapted to allow a user to remove a portion of the liquid from inside the bottle 100. In one particular embodiment, the body portion 102 further includes a tapered middle portion adapted for a hand of a user to grasp the bottle 100 and squeeze causing liquid within the bottle 100 to be forced up and out through the spout 108. The cap 104 may also include an integrated loop 110 with an aperture 112, as shown in FIG. 2, that may be used to carry the bottle 100.

Figure 3:
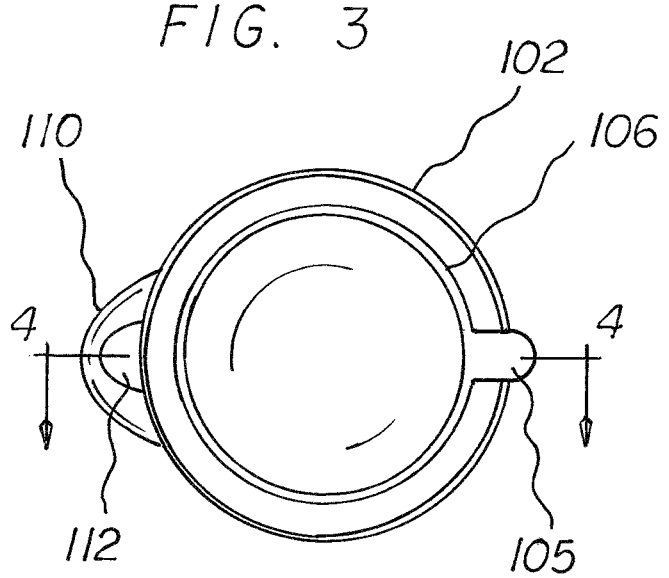
FIG. 3 is a bottom view of the particular illustrative embodiment of the molded bottle for liquids.

Referring now to FIG. 3, the annular sidewall 106 extends around the periphery of the body portion 102 of the bottle 100, forming a concave surface that forms an air tight seal and vacuum to hold the bottle 100 to the planar surface. The bottle 100 is generally cylindrical in shape, although any shape of the bottle 100 may be used. The tab 105 is sized so that a user may easily grasp between fingers and pull up to break the vacuum seal of the annular sidewall 106 and the planar surface.

Figure 4:
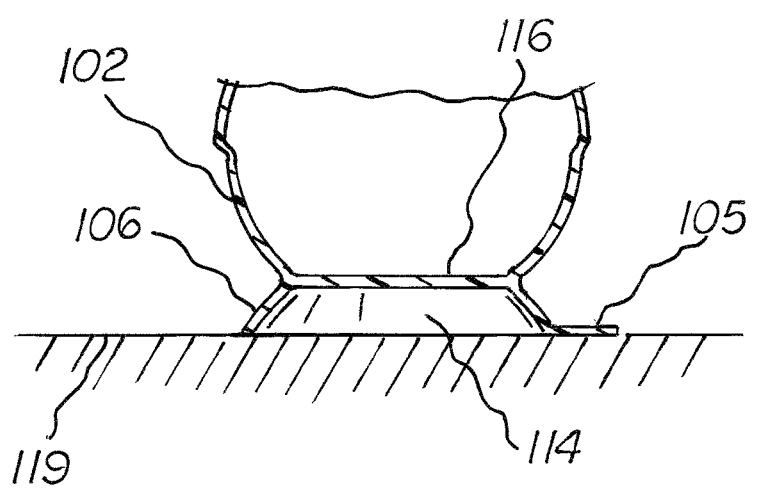
FIG. 4 is a partial cross sectional view on line 4-4 of FIG. 3, showing the integrated sidewall extending from a body portion of the bottle.

As shown in FIG. 4, a bottom 116 of the body portion 102 and the annular sidewall 106 are used to form a suction cavity 114 when the bottle 100 is pressed downward on a planar surface 119 to form the air tight connection. As the bottle 100 is pressed down on to the planar surface 119, air contained within the suction cavity 114 is forced out as the suction cavity 114 is compressed to form the vacuum seal between the bottle 100 and the planar surface 119. One advantage of this embodiment is that the body portion 102 of the bottle 100 and the annular sidewall 106 are formed or molded as one piece so that they cannot be separated from one another and lost. Thus, the bottle 100 is convenient to use and a means to secure the bottle 100 itself to the planar surface 119 is always readily unlike any other bottles.

Figure 5:
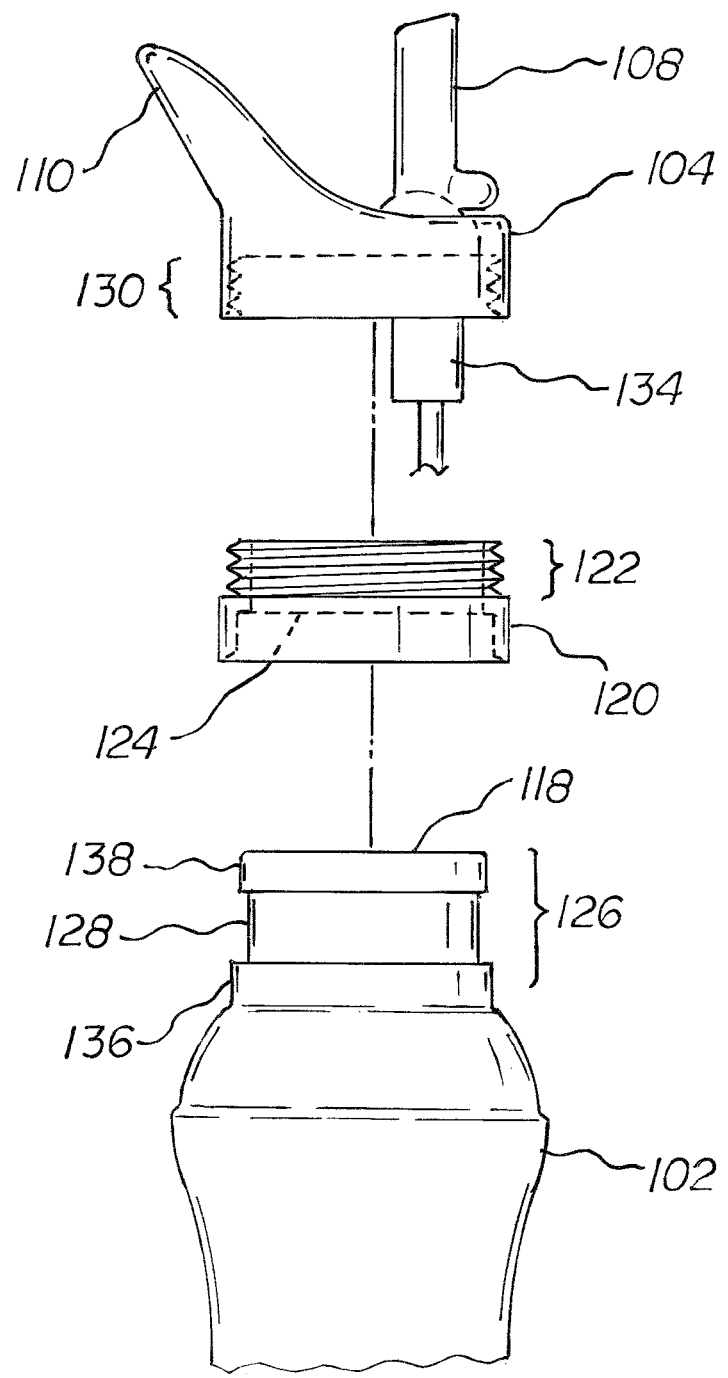
FIG. 5 is an exploded view with a cap removed from the bottle.

Referring now to FIG. 5, an opening 118 on a top of the body portion 102 allows access to an interior of the bottle 100 to empty or fill the bottle 100. To secure the cap 104 to the body portion 102, an annular ring 120 is adapted to slip around the neck portion 126 or top of the body portion 102 where the annular ring 120 has exterior threading 122. The removable cap 104 includes interior threading 130, where the interior threading 130 is adapted to secure to the exterior threading 122 of the annular ring 120. Accordingly, the cap 104 is adapted to be screwed on and off the ring 120 to fill and empty the body portion 102 of the bottle 100. In this particular embodiment, the ring 120 is made of a stiff plastic or other similar material that fits around the flexible material of the body portion 102. The rigidity and stiffness of the ring 120 permits a secure water tight connection between the flexible body portion 102, which may be silicone, and the cap 104. The neck portion 126 has a step down to a smaller diameter 128 so that the ring 120 can be slipped down over a lip 138, where the lip 138 prevents the ring 120 from sliding off the neck portion 126. The neck portion 126 also has a step up that forms a ledge 136 where a lip 124 of the ring 120 is adapted to friction fit over the ledge 136 and secure the ring 120 from sliding down the body portion 102 of the bottle 100.

A tube or straw 134 may be in fluid communication with the removable cap 104 and an interior of the body portion 102. The body portion 102 and annular sidewall 106 of the bottle 100 is made of a material that is elastic with a memory to return to an original shape after being deformed. In another embodiment, the body portion 102 may be made of a rigid material. The body portion 102 of the bottle 100 may have an insulating property to maintain a temperature of the liquid stored therein. As explained above, an advantage of the bottle 100 is that the annular sidewall 106 of the bottle 100 is configured to flex outward when the bottle 100 is pressed down onto the planar surface 119 to form a vacuum between the body portion 102 and the planar surface 119 to prevent the bottle 100 from moving.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A bottle, the bottle comprising:
a body portion adapted to store liquids therein, wherein the body portion is elastic with a memory to return to an original shape after being deformed;
an opening on a top of the body portion to access an interior of the bottle;
an annular sidewall extends outward around a bottom periphery of the body portion, wherein the bottle is supported by an edge of the annular sidewall when the bottle is placed on a planar surface;
the annular sidewall is configured to flex when the bottle is pressed down onto the planar surface to form a vacuum between the body portion and the planar surface to prevent the bottle from moving;
the annular sidewall further comprising a tab secured to the edge of the annular sidewall and adapted to release the vacuum between the annular sidewall and the planar surface; and
the body portion further comprising an annular ring around the top of the body portion, wherein the annular ring having exterior threading.

2. The bottle of claim 1, the bottle further comprising a removable cap having interior threading that is adapted to secure to the exterior threading of the annular ring.

* * * * *